United States Patent
Ileogben

(10) Patent No.: US 7,818,892 B1
(45) Date of Patent: Oct. 26, 2010

(54) METHOD AND APPARATUS FOR PREPARING A DUCT FOR TRAVERSAL

(76) Inventor: Pius O Ileogben, 255 Brady Walk, Lawrenceville, GA (US) 30045

( * ) Notice: Subject to any disclaimer, the term of this patent is extended or adjusted under 35 U.S.C. 154(b) by 0 days.

(21) Appl. No.: 12/080,332

(22) Filed: Apr. 2, 2008

(51) Int. Cl.
G01B 1/00 (2006.01)

(52) U.S. Cl. .......................... 33/562; 33/529

(58) Field of Classification Search ............... 33/562, 33/529, 473
See application file for complete search history.

(56) References Cited

U.S. PATENT DOCUMENTS

| | | | | |
|---|---|---|---|---|
| 307,321 | A * | 10/1884 | Osborn | 33/464 |
| 794,409 | A | 7/1905 | Irving, Jr. | |
| 1,199,591 | A * | 9/1916 | Melara | 33/7 |
| 1,636,025 | A | 7/1927 | Waede | |
| 2,367,582 | A | 1/1945 | Honyoust | |
| 2,632,250 | A * | 3/1953 | Rauser | 33/26 |
| 2,818,644 | A | 1/1958 | Crawford | |
| 3,082,537 | A * | 3/1963 | Solomon | 33/529 |
| 3,096,586 | A | 7/1963 | Albright et al. | |
| 3,670,418 | A * | 6/1972 | Hamilton, Jr. | 33/419 |
| 3,859,002 | A | 1/1975 | Sauey | |
| 3,949,481 | A * | 4/1976 | Campbell | 33/25.1 |
| 4,060,902 | A | 12/1977 | Keller | |
| 4,312,133 | A | 1/1982 | Mima | |
| 4,367,593 | A * | 1/1983 | Whitworth | 33/529 |
| 4,497,119 | A * | 2/1985 | Dearman | 33/464 |
| 4,538,354 | A | 9/1985 | Smolik | |
| 4,614,043 | A * | 9/1986 | Nagano et al. | 33/529 |
| 4,644,663 | A | 2/1987 | Needs | |
| 4,653,194 | A | 3/1987 | Kim | |
| 4,813,149 | A * | 3/1989 | Herkimer | 33/462 |
| 5,131,164 | A * | 7/1992 | Miller | 33/613 |
| 5,239,762 | A | 8/1993 | Grizzell | |
| D356,966 | S | 4/1995 | Rowe | |
| 6,293,028 | B1 * | 9/2001 | Sylvia | 33/613 |
| 6,598,308 | B1 | 7/2003 | Johansson et al. | |
| 6,839,974 | B1 | 1/2005 | Hitchcock | |
| 7,073,267 | B2 * | 7/2006 | Butler et al. | 33/203 |
| 7,162,805 | B2 | 1/2007 | Vick | |
| 7,178,252 | B1 * | 2/2007 | Belgard | 33/412 |
| 7,370,431 | B2 * | 5/2008 | Sowder | 33/529 |
| 2006/0048401 | A1 * | 3/2006 | Kishikawa | 33/375 |

* cited by examiner

*Primary Examiner*—G. Bradley Bennett
*Assistant Examiner*—Tania C Courson
(74) *Attorney, Agent, or Firm*—Charlene Thorpe, Esq.; The Law Office of Charlena Thorpe Inc.

(57) ABSTRACT

A duct traversal preparation apparatus that temporarily adheres to a surface to enable hands-free traversal is provided. The apparatus includes scales to accurately locate the positions of traverse holes and a template with a locking device to guide the drilling of the traverse holes. The apparatus also orients a measuring probe to coordinates for accurate and repeatable airflow measurement.

2 Claims, 5 Drawing Sheets

METHOD AND APPARATUS FOR PREPARING A DUCT FOR TRAVERSAL

FIELD

Embodiments of the present invention relates to systems and methods for traversing a duct to obtain the volume of air in the duct and the like, and more particularly to systems and methods for reducing the use of reference standards and complex computations associated with the process.

BACKGROUND

Traversing a duct is the standard method for measuring air velocity in a duct to obtain the volume of air flowing through the duct. Duct traversal is a two step process. First, the duct is prepared to measure the velocity of air at predetermined coordinates within the duct and then the airflow at the predetermined coordinates is measured. To determine air volume, the average velocity is multiplied by the cross sectional area of the duct.

To prepare a rectangular duct for traverse, a predetermined number of holes are drilled at predetermined locations across the surface of the duct. To calculate the number and locations of the holes, the width and depth of the cross section of the duct at the point of the traverse is measured using a ruler or tape rule. Once the number and the location of the holes are calculated, the positions of the holes are marked on the duct and thereafter the holes are drilled.

To measure the air velocity at the predetermined coordinates, a measuring probe connected to a velocity measuring instrument is inserted into the holes, one hole at a time. More specifically, before measuring the air velocity at the predetermined coordinates, the spacing of the coordinates in the duct is marked on the measuring probe. When the probe is inserted into the duct through a hole, it is oriented to a specific direction within the duct. Then, the air velocity is measured by moving the probe to each predetermined coordinates using the marks on the probe as reference. For accurate measurement, the probe is required to maintain a specific orientation within the duct during each measurement. This process is continued until the airflow has been measured through each hole.

Because ducts are generally installed overhead, duct traversal is generally most convenient from the bottom of a duct. But, holding a tape rule to the bottom of a duct to measure and mark the positions of the holes is very challenging. It also is very difficult to drill the holes and prevent the drill bit from walking. These tasks are made even more difficult because they are performed while standing on a ladder and looking upwards. In addition, using duct traverse reference materials and calculating the coordinates could be very tasking in field conditions.

While measuring the velocity, a technician is required to orient the probe to predetermined coordinates using the marks on the probe as reference as he pushes the probe Into the duct looking up. This process also takes place while the technician is standing on a ladder with the flow reading instrument dangling from his neck.

Although some ducts are installed at an angle, the traversing process is still the same. Developing a practical process or device to accurately determining the air volume in a duct based on the theory of duct traversing has not been achieved due to difficulties associated with duct traversal as discussed above. Consequently, due to the imprecise manner in which duct traversal is performed, the air volume calculated for a particular duct will be different each time air volume is calculated.

As discussed above, the process of duct traversal is inefficient and laborious, and multitasking on a ladder makes duct traversal unsafe. Embodiments of the present invention address these problems.

SUMMARY

Embodiments of the present invention reduce all the engineering formulations involve in duct traversal to a user friendly portable instrument that provides accuracy and repeatability. Embodiments of the present invention adhere and align to the surface of a duct for hands free operation, provides means for measuring the size of the duct, and provides means for determining the locations of the holes for duct traversal. Embodiments of the present invention include means for guiding drill bits to drill perpendicularly and for preventing bits from walking during the drilling.

During flow measurement, embodiments of the present invention indicate the locations of the coordinates to measure air velocity and keep the probe oriented appropriately. Embodiments of the present invention allow the probe to be read at eye level and not looking up. Embodiments of the present invention reduce the use of complex calculations and references.

Both the foregoing general description and the following detailed description are exemplary and explanatory only and are not restrictive of the invention, as claimed.

DETAILED DESCRIPTION

Figure 4:
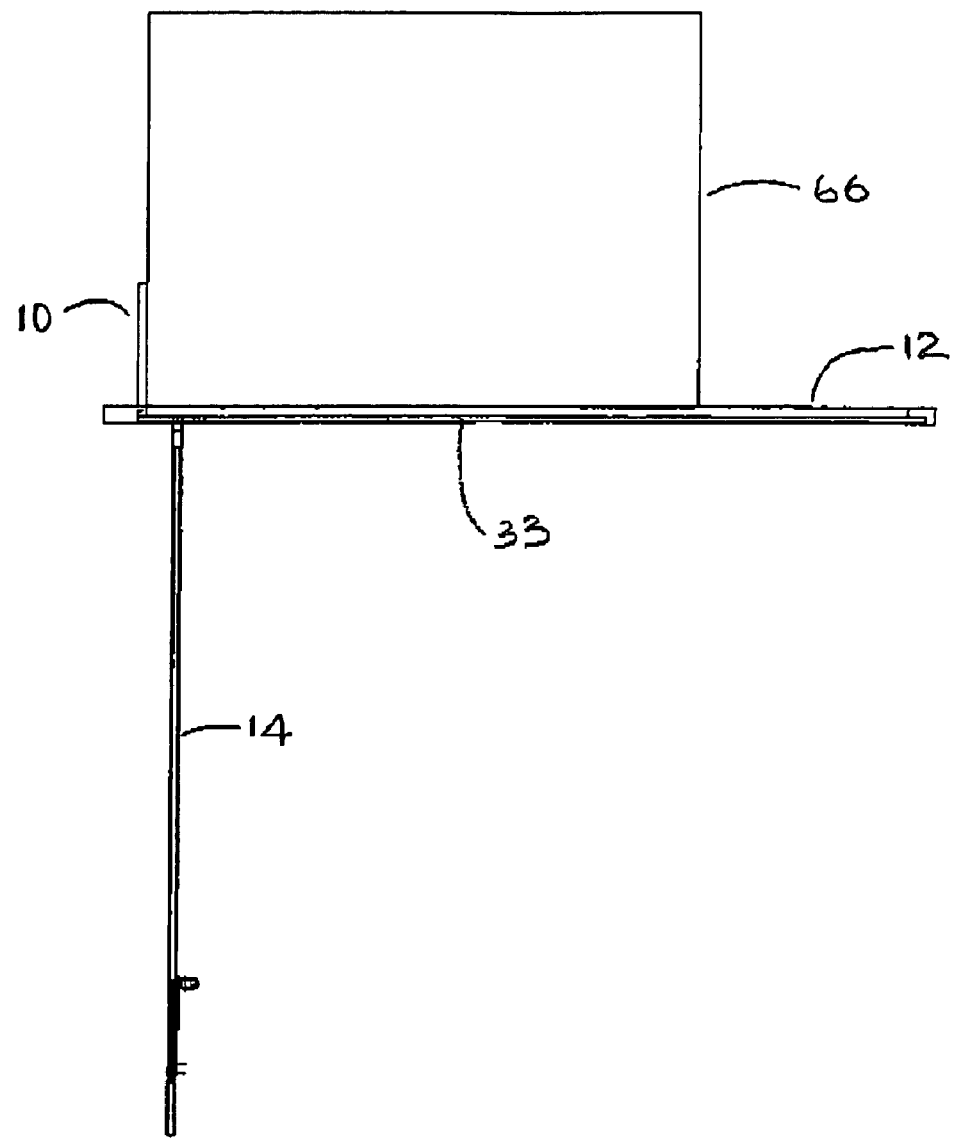
FIG. 4 illustrates an exemplary cross-sectional side view of the duct traversal preparation apparatus of FIG. 1 when used in its intended manner with an exemplary duct.

FIG. 4 illustrates a duct traversal preparation apparatus 100 according to a preferred embodiment of the present invention. The duct traversal preparation apparatus 100 may include a magnetized plate 10, a hole preparation guide 12, and an airflow measurement guide 14.

The magnetized plate 10 provides the primary means for attaching and aligning the duct traversal preparation apparatus 100 to a duct 66. When the magnetized plate 10 is attached to the duct 66 during use, the magnetized plate 10 is perpendicular to hole preparation guide 12 as shown in FIG. 4.

Figure 1:
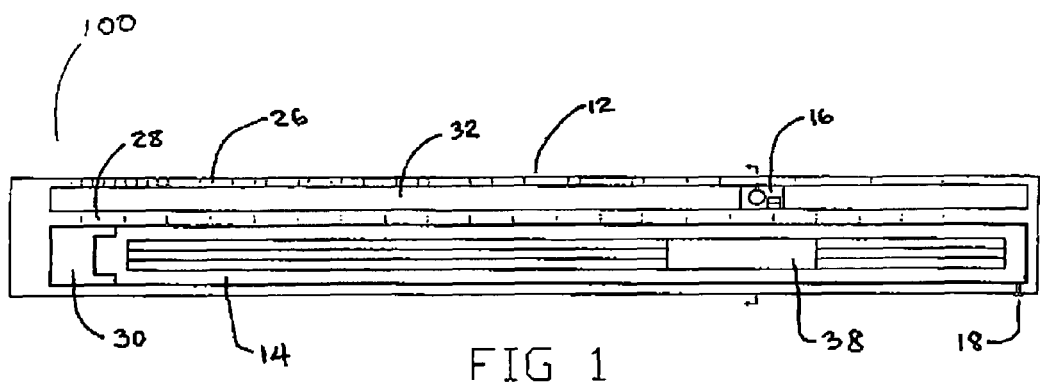
FIG. 1 illustrates a duct traversal preparation apparatus according to one embodiment of the invention.
Figure 2:
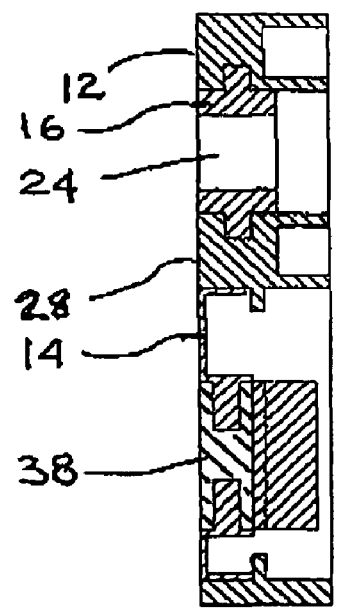
FIG. 2 illustrates a cross-sectional view of the duct traversal preparation apparatus of FIG. 1.

FIG. 1 illustrates hole preparation guide 12 and the airflow measurement guide 14 of the duct traversal preparation apparatus 100 in a folded state. As shown in FIG. 1, duct traversal preparation apparatus 100 also may include a release pin 18 and carriage 30. Release pin 18 holds airflow measurement guide 14 to hole preparation guide 12. Carriage 30 provides a means for moving airflow measurement guide 14 along channel 33 of hole preparation guide 12.

As shown in FIG. 1, hole preparation guide 12 may include scales 26, 28 and a template 16. Scale 26 is a scale used for measuring the width of the duct 66. Scale 28 is a predetermined set of numbers that shows the positions of where the traverse holes should be on the duct based on the duct width read on scale 26.

Figures 3A, 3B:
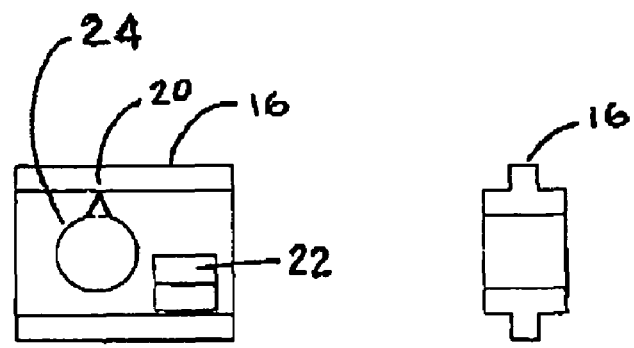
FIG. 3A illustrates a template of the duct traversal preparation apparatus of FIG. 1.
FIG. 3B illustrates a cross-sectional view of the template of FIG. 3A.

FIGS. 3A and 3B illustrates template 16 in greater detail. As shown in FIG. 3A, template 16 may include a predetermined bore 24, an arrow 20, and a locking device 22. The bore 24 provides a means of guiding drill bit to drilling holes perpendicular to the duct. The arrow 20 is used to line up the bore 24 on the template 16 to the drill position indicators on scale 28. The locking device 22 keeps the template 16 in a fixed position during the drilling of the hole thereby preventing the drill bit from walking. Hole preparation guide 12 may be strategically magnetized to provide a secondary means of attaching the duct traversal preparation apparatus 100 to the duct 66.

Figure 5:
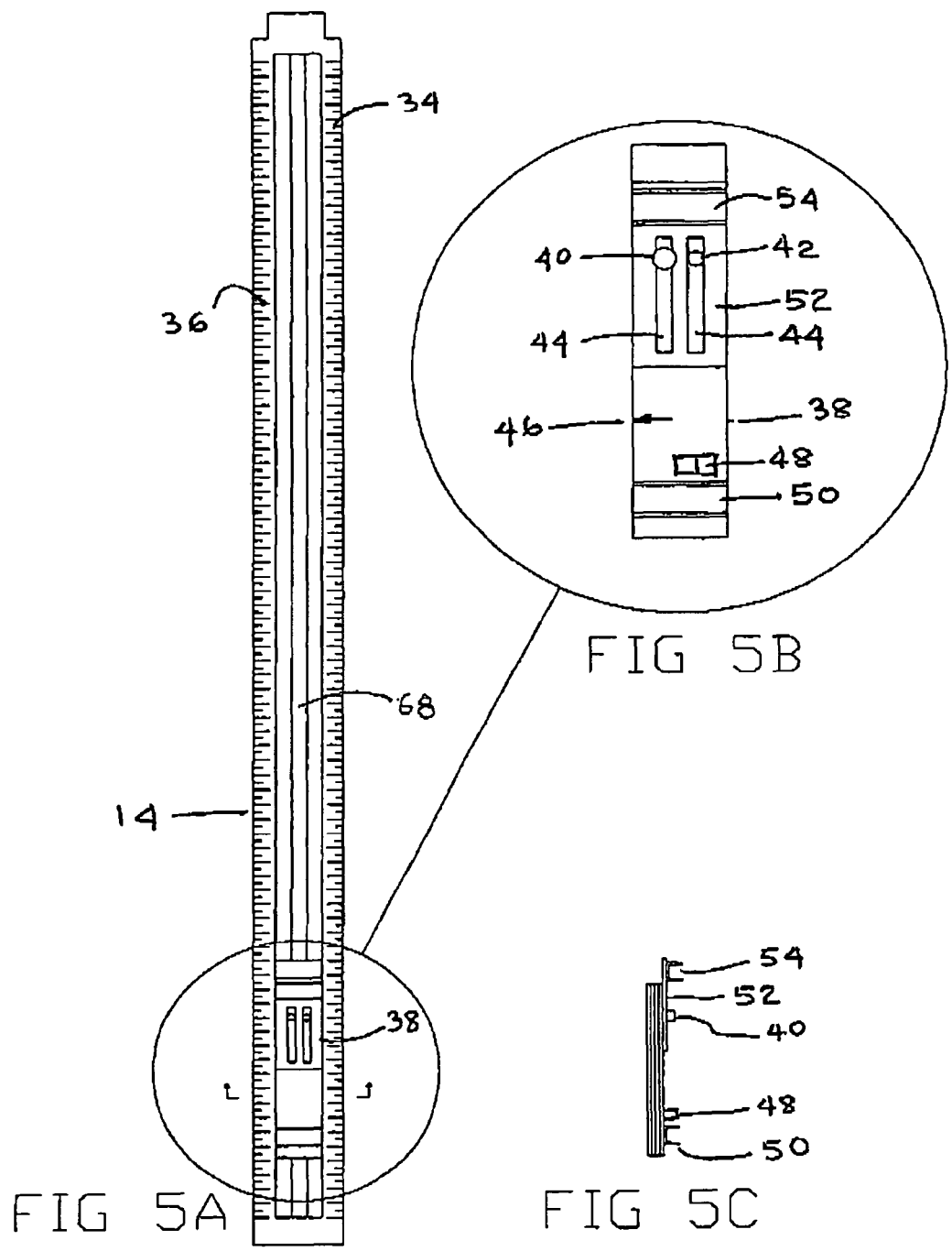
FIG. 5A illustrates an airflow measurement guide of the duct traversal preparation apparatus of FIG. 1.
FIG. 5B illustrates an enlarged view of a probe fixture of the airflow measurement guide of FIG. 5A.
FIG. 5C illustrates a side view of the probe fixture of FIG. 5B.

FIGS. 5A-5C illustrate the airflow measurement guide 14 in greater detail. Airflow measurement guide 14 may provide a means for locating and aligning a measuring probe to predetermined coordinates for accurate airflow measurement. Airflow measurement guide 14 may include scales 34 and 36 and a probe fixture 38. Scale 34 is a scale used for measuring the depth of the duct 66. Scale 36 is a predetermined set of numbers that shows the coordinates to measure the airflow that is unique to the depth of the duct read on scale 34.

Probe fixture 38 provides a means for moving the probe in and out of duct 66 and to predetermined coordinates. Probe fixture 38 may include an adjuster 52, threaded pin with nut 40, stud 42, wedge 48, marker 46, and handle 50. The adjuster 52 includes bracket 54 and two slots 44 and provides a means for calibrating the probe fixture 38 with scales 34 and 36. Bracket 54 holds and maintains the orientation of the probe, while slots 44 provide a means for changing the position of the adjuster 52.

The threaded pin with nut 40 and the stud 42 are attached perpendicularly to the probe fixture 38. Threaded pin with nut 40 and the stud 42 fit through the slots 44 on the adjuster 52 and provide the means for keeping the adjuster 52 in a predetermined orientation. In addition, the threaded pin with nut 40 provides a means for attaching the adjuster 52 to the probe fixture 38. The wedge 48 provides a means for holding the probe fixture 38 to a position and the handle 50 is used to hold the probe fixture 38. The marker 46 provides a means of lining up the probe to its coordinates on scale 36.

Figure 6:
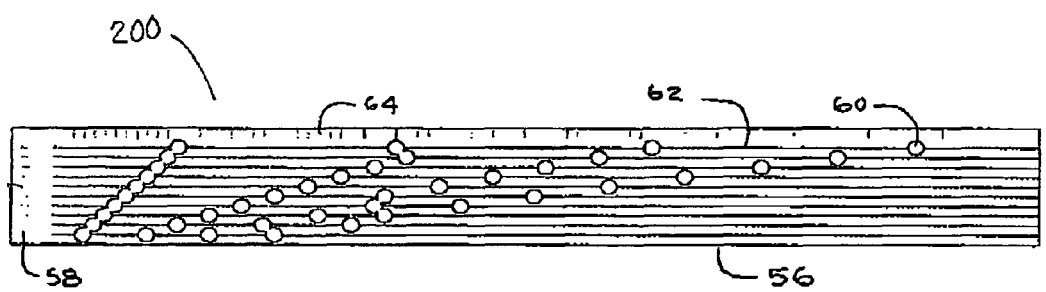
FIG. 6 illustrates a duct traversal preparation apparatus according to another embodiment of the invention.

As discussed above, there are two distinct activities in duct traversing—duct prep and airflow measurement. The two activities may not necessarily be performed at the same time. The duct prep is done first and only once, while the flow measurement could be on-going and as such each of the activities can have separate instrument configured in a variety of ways. FIG. 6 illustrates a duct traversal preparation apparatus 200 according to an alternate embodiment of the present invention.

Duct traversal preparation apparatus 200 attaches to duct 66 just like duct traversal preparation apparatus 100. Duct traversal preparation apparatus 200 can be used to read duct width, locate positions of traverse holes, and guide the drill bit to bore perpendicular holes. Duct traversal preparation apparatus 200 comprises a template 56 with a plurality of rows 58 of bores 60, whereby each row 58 represents a duct width and the bores 60 are the locations of the traverse holes. The centerline 62 connects the bores 60 on the same row for clarity and ease of use in field condition. Scale 64 provides the means of reading the duct width.

A method of operating the duct traversal preparation apparatus will now be described. With duct traversal preparation apparatus 100 facing down, unfold magnetized plate 10 to an upright position. Then, attach duct traversal preparation apparatus 100 to duct 66 by holding the bottom of the duct traversal preparation apparatus 100 to the bottom of duct 66, with magnetized plate 10 on the side of duct 66. The duct traversal preparation apparatus 100 will align itself to duct 66, by design.

To locate and drill traverse holes, read the width of the duct 66 on scale 26. Then, slide the template 16 along the channel 32 stopping at each location on scale 28 at which the arrow 20 on the template 16 points to the number corresponding to the width of the duct obtained in scale 26. At each of the locations, drill a hole on the duct 66 through the bore 24, locking down the template 16 as necessary to prevent it from moving. For example, if the width of the duct 66 was determined to be 18", then drill a hole at every location that the arrow 20 on the template 16 points at the number 18 on scale 28. After drilling, the holes are plugged with caps to prevent air leakage. The channel 32 is sized to stride the caps such that the accuracy of the hole can be collaborated with the caps on.

To perform air velocity measurement, release airflow measurement guide 14 by pulling the release pin 18. insert the nozzle of the probe into a hole in the duct 66 and with the nozzle resting on the floor of the duct 66, push the leg of the probe into the bracket 54. If the probe fixture 38 is not lined with scales 34 and 36, calibrate the probe fixture 38 by loosening the nut 40 to adjust bracket 54. Once calibrated, move the probe fixture 38 until the probe reaches the ceiling of the duct 66 and read the depth of the duct 66 on scale 34. Slide the probe fixture 38 along channel 68 to each location on scale 36 with the same number as the depth of the duct 66. These are the coordinates where the airflow would be read. Repeat the procedure at each hole. For example, if it was determined that the depth of the duct was 12" on scale 34, then the coordinates would be at every point on scale 36 where the arrow on the probe fixture lines up with the number.

Many modifications and other embodiments of the invention will come to mind to one skilled in the art to which this invention pertains having the benefit of the teachings presented in the forgoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:

measuring the width of a duct using a first scale having a first set of indicators;

determining hole locations to be drilled in the duct using a second scale having a second set of indicators that are scaled differently than the first set of indicators and that are a predefined function of the first set of indicators;

measuring the depth of the duct using a third scale having a third set of indicators; and determining measuring locations to measure air velocity using a fourth scale having a fourth set of indicators that are scaled differently than the third set of indicators and that are a predefined function of the third set of indicators.

2. An apparatus comprising:

means for measuring the width of a duct using a first scale having a first set of indicators;

means for determining hole locations to be drilled in the duct using a second scale having a second set of indicators that are a predefined function of the width of the duct;

means for measuring the depth of the duct using a third scale having a third set of indicators; and means for determining measuring locations to measure air velocity using a fourth scale having a fourth set of indicators that are a predefined function of the depth of the duct.

* * * * *